Nov. 17, 1925.  
G. A. BARNARD  
1,561,680  
GAME TRAP  
Filed March 19, 1925  2 Sheets-Sheet 2
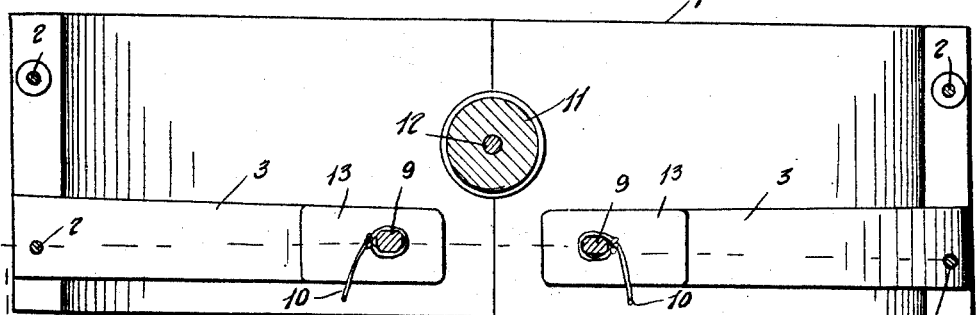
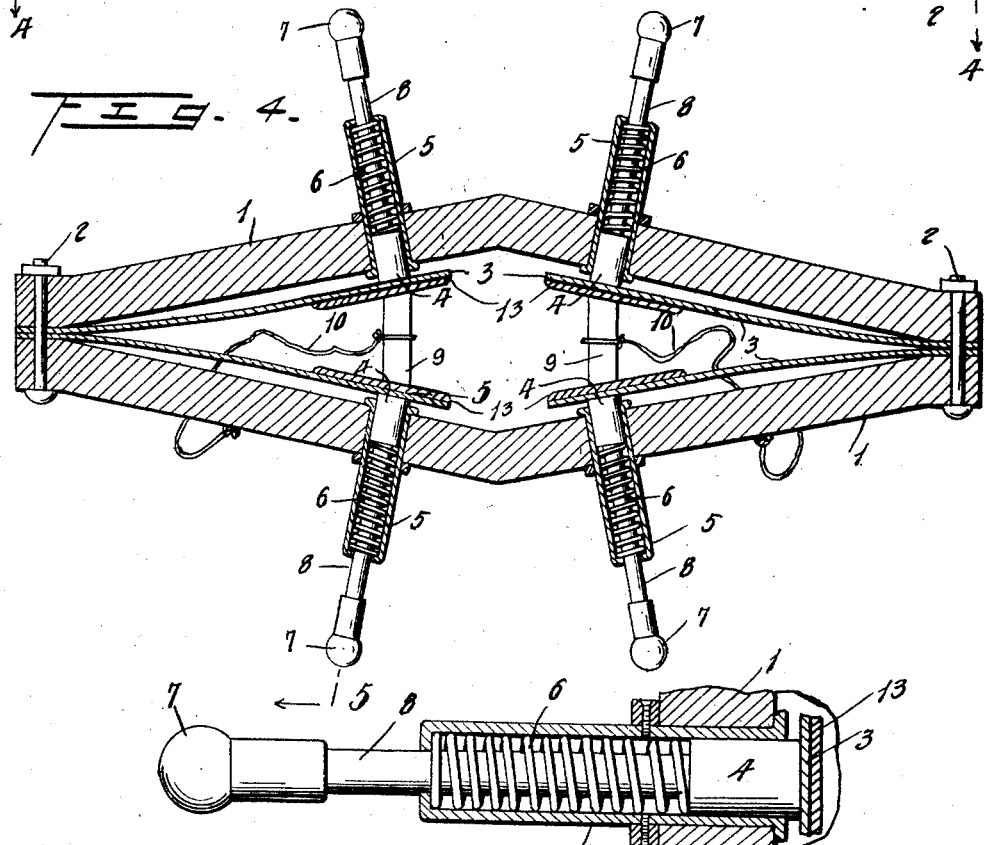
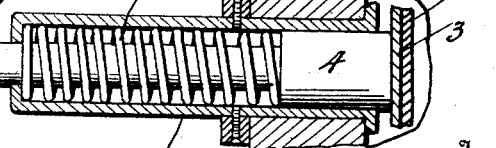
Inventor  
G. A. Barnard  
By  
Attorney Patented Nov. 17, 1925.

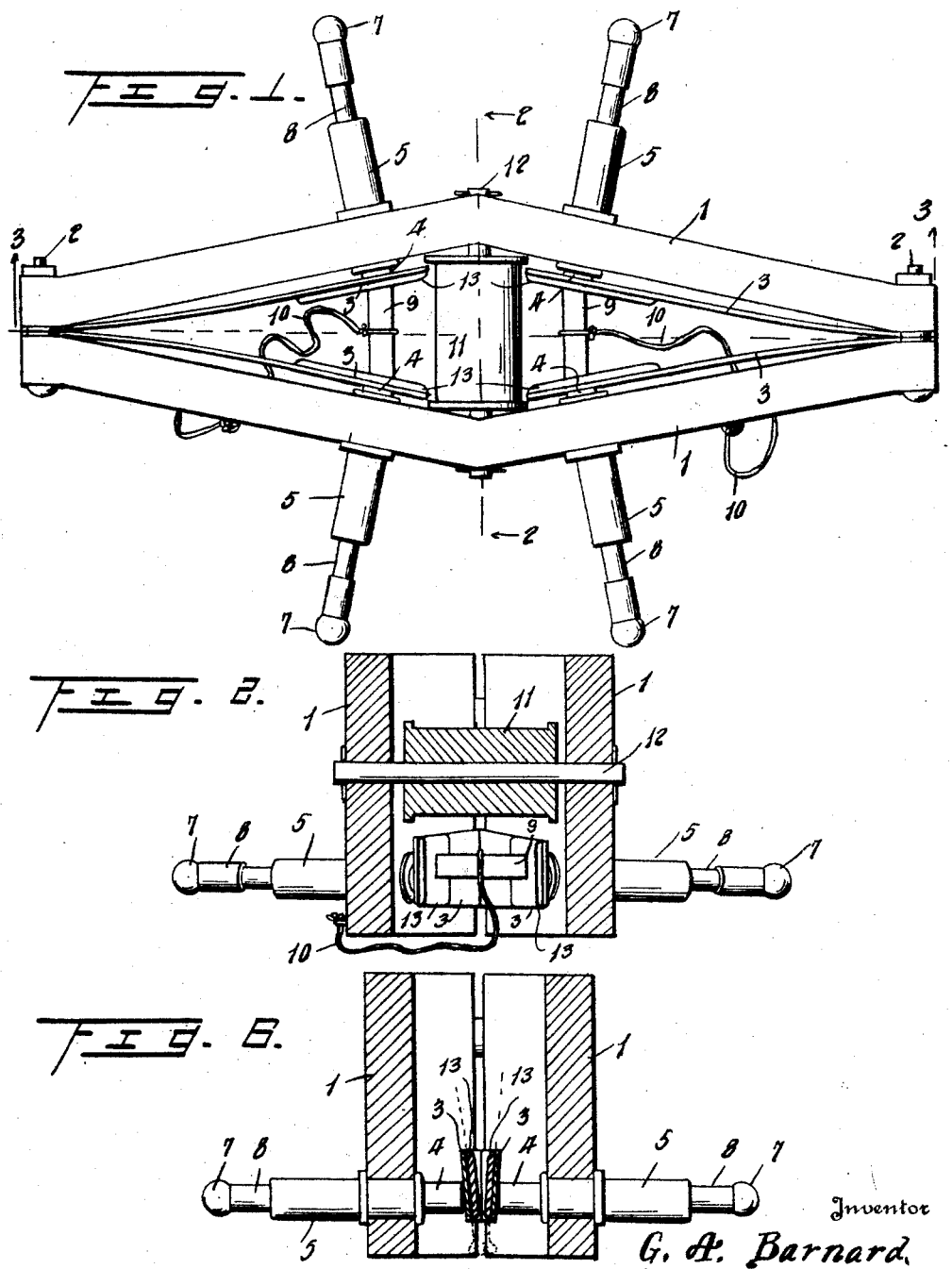

1,561,680

UNITED STATES PATENT OFFICE.

GEORGE A. BARNARD, OF PEMBINE, WISCONSIN.

GAME TRAP.

Application filed March 19, 1925. Serial No. 16,750.

*To all whom it may concern:*

Be it known that I, GEORGE A. BARNARD, a citizen of the United States, residing at Pembine, in the county of Marinette and State of Wisconsin, have invented certain new and useful Improvements in Game Traps; and I do hereby declare the following to be a full, clear, and exact description of the invention, such as will enable others skilled in the art to which it appertains to make and use the same.

The invention relates to traps for catching and holding fur bearing animals and game generally, and has for its object the provision of a trap that will catch and hold an animal without injuring it or causing it pain, so that the fur will not be injured or disfigured.

The invention also contemplates the provision of a trap that is reasonable in cost of manufacture, simple in operation, and that is practically indestructible, and in which the entrapped animal may be easily released, and the trap reset without endangering the trapper to injury.

The construction and advantages of the invention will be described in detail hereinafter and will be found illustrated in the accompanying drawings, in which—

Figure 1 is a top plan view of the improved trap showing it set,

Figure 2 a cross section on a plane indicated by the line 2—2 of Figure 1,

Figure 3 a central longitudinal sectional view on a plane indicated by the line 3—3 of Figure 1, Figure 4 a longitudinal sectional view on a plane indicated by the line 4—4 of Figure 3, Figure 5 a detail section on a plane indicated by the line 5—5 of Figure 4, and Figure 6 is a cross section showing the trap sprung after removal of the trigger block.

In the drawings similar reference characters will be used to designate corresponding parts throughout the several views.

The trap consists of two V-shaped plates 1 secured at their ends by means of bolts and nuts 2 or any other suitable fastenings, the plates 1 being made preferably of a heavy material, such for instance as metal.

Secured between each end of the plates 1 by means of one of the bolts 2 are spring fingers 3 which extend toward the middle of the trap, and are engaged by plungers 4 that are mounted in housings 5 secured in side plates 1, and 6 indicates springs normally tending to project plungers 4. 7 indicates the knob on the stem 8 of each plunger 4 to permit hand operation of the plunger against the resistance of spring 6 in setting the trap.

In setting the trap a trigger block 9 is used to hold the fingers 3 apart and the plungers 4 in a retracted position, the trigger blocks 9 being connected to one of the plates 1 by a flexible member 10.

11 designates a roller journaled on shaft 12 mounted on and connecting plates 1, said rollers being positioned above the plane of the fingers 3 and plungers 4 and the trigger blocks 9 when in a set position. The purpose of the roller 11 is to cause the animal whose foot comes in contact with the roller to lose its footing and its leg will knock out one of the blocks 9 from between the fingers 3 when the springs 6 will react and drive the plungers 4 outwardly of the housings 5 and cause the fingers 3 to closely engage the animal's leg above its paw. The roller 11 also acts to prevent the animal releasing itself by pulling its paw outwardly toward the end of the fingers 3, as it might otherwise do if the roller was not in the position shown.

As shown clearly in Figure 6 the plungers 4 engage the fingers 3 adjacent to their lower edges thus causing the fingers to assume the inclined positions shown in Figure 6 so that the lower edges of the fingers more closely engage the animal's leg and thus add to the effectiveness of the trap.

To add to the effectiveness of the trap and also to prevent injury to the trapped animal's leg, the spring fingers 3 are covered on their adjacent sides by means of a layer of rubber or other non-abrasive material 13. This covering adds to the effectiveness of the trap as stated by frictionally engaging the leg of the animal.

What is claimed is:—

1. In an animal trap, plates spaced apart intermediate of their ends, spring fingers secured between the plates, spring actuated plungers engaging said spring fingers, and a trip block adapted to be inserted between the spring fingers in setting the trap.

2. In an animal trap, V-shaped plates secured at their ends and providing an enclosure, spring fingers secured between the ends of the plates, spring actuated plungers engaging said spring fingers, and a trip block adapted to be inserted between the spring fingers and hold them and the spring actuated plungers in retracted positions.

3. In an animal trap, plates spaced apart intermediate of their ends, spring fingers secured between the plates, spring actuated plungers engaging said spring fingers, a trip block adapted to be inserted between said spring fingers to hold them and the spring actuated plungers in retracted positions, and a roller journaled in proximity to said spring fingers and plungers.

4. An animal trap comprising V-shaped plates secured at their ends and forming an enclosure, spring fingers secured between the ends of the plates, housings mounted on said plates, spring actuated plungers in said housings and engaging said spring fingers, a trip block adapted to be inserted between said fingers and hold them and the spring actuated plungers in retracted position, and a roller journaled between said V-shaped plates and in proximity to said spring fingers and plungers.

In testimony whereof I affix my signature.

GEORGE A. BARNARD.